United States Patent [19]

Milillo

[11] Patent Number: 5,063,404

[45] Date of Patent: Nov. 5, 1991

[54] DOCUMENT ILLUMINATION ASSEMBLY ADAPTED TO REDUCE PLATEN OVERHEATING

[75] Inventor: Richard J. Milillo, Fairport, N.Y.

[73] Assignee: Xerox Corporation, Stamford, Conn.

[21] Appl. No.: 620,693

[22] Filed: Dec. 3, 1990

[51] Int. Cl.$^5$ ............................................. G03B 27/52
[52] U.S. Cl. ......................................... 355/30; 355/67
[58] Field of Search ...................... 355/30, 67, 70, 71; 352/202; 353/52, 97; 362/6

[56] References Cited

U.S. PATENT DOCUMENTS

| | | | |
|---|---|---|---|
| 3,712,731 | 1/1973 | Shiina | 355/71 |
| 3,936,672 | 2/1976 | Tanaka | 240/47 |
| 4,143,964 | 3/1979 | Ogura et al. | 355/30 |
| 4,183,656 | 1/1980 | Ishihara | 355/8 |
| 4,300,831 | 11/1981 | Isago | 355/67 |
| 4,386,842 | 6/1983 | Beery | 355/8 |
| 4,411,516 | 10/1983 | Adachi et al. | 355/67 |
| 4,422,100 | 12/1983 | DuVall et al. | 355/67 X |
| 4,632,539 | 12/1986 | Temple | 355/30 |
| 4,684,237 | 8/1987 | Buchar et al. | 355/8 |
| 4,721,980 | 1/1988 | Yazaki | 355/30 X |
| 4,827,313 | 5/1989 | Corona | 355/30 |
| 4,954,862 | 9/1990 | Lee et al. | 355/67 X |

FOREIGN PATENT DOCUMENTS 56-62269 5/1981 Japan .

Primary Examiner—Richard A. Wintercorn

[57] ABSTRACT

A scanning/illumination assembly for a document copier is modified to reduce overheating conditions at the glass platen on which the document is placed during a scan/copy mode. The illumination lamp, which produces both light and an unwanted byproduct of heat, is placed within a glass tube open at both ends. The glass tube is nested within a curved portion of an associated reflector. Heat which would normally build up at the platen surface is instead contained within the space between the lamp envelope and the glass tube, and is transferred out the ends of the glass tube annulus along a convection path. Heat is also absorbed by the glass tube and transferred by convection to the air surrounding the glass tube. An additional component of heat transfer is by conduction from the glass tube to a heat sink established within the scan carriage via the seating reflector. Heat transfer as described is assisted by the movement of the illumination assembly during scan mode.

Convection heat transfer can be enhanced by the use of blower(s). Also, convection heat transfer can be enhanced by the use of a conduit and blower system to establish a predetermined forced air flow through the glass tube annulus.

6 Claims, 3 Drawing Sheets

DOCUMENT ILLUMINATION ASSEMBLY ADAPTED TO REDUCE PLATEN OVERHEATING

BACKGROUND AND MATERIAL DISCLOSURE STATEMENT

The present invention relates to a document illumination apparatus for an electrophotographic copying machine and, more particularly, to a cooling arrangement associated with the document illumination lamp to prevent platen overheating.

In conventional copying machines, an original document to be reproduced is placed or conveyed onto a glass platen located in the object plane. The document is incrementally illuminated by an elongated lamp assembly, either by moving the platen while the lamp is held stationary, or by moving the lamp assembly (lamp reflector and scan mirror) beneath a stationary platen. Alternatively, both the scan lamp and the platen can be held fixed and the document moved across the platen surface in a continuous velocity transport (CVT) mode. In any of these cases, a problem to be anticipated and prevented is a build-up of heat at the platen, the heat being a byproduct of operation of the scanning lamp. The lamps used for document scanning are typically mercury fluorescent or tungsten halogen. With either source, but particularly with the tungsten halogen type of lamp, the heat build-up at the platen may pose a problem with continued operation. With continued usage, the platen may become so hot as to present a safety concern for the machine operator or cause defects in the platen glass.

There are various prior art solutions to the lamp overheating problem. One solution is to provide some kind of cooling to the lamp, using blowers or fans to create a flow of heated air moving into a vent area of the machines. Representative of this type of solution is U.S. Pat. No. 4,143,964 which disclosed placing the illumination lamp at the focal point of a curved apertured reflector, and blowing air through the aperture onto the lamp along its length. U.S. Pat. No. 4,632,539 discloses an apparatus for cooling a fluorescent lamp by causing a flow of cooling air to pass along a conduit extending along the length of the lamp. U.S. Pat No. 3,936,672 discloses a ventilating fan which blows air into a casing surrounding the lamp.

Another design solution to the platen overheating problem is to utilize the principles of heat transfer by placing a heat transfer mechanism in proximity to the lamp to direct heat away from both the lamp and the platen. U.S. Pat. No. 4,411,516 discloses a system for cooling an area surrounding a halogen lamp by forming a heat pipe integral with the reflectors surrounding the lamp. The heat pipe serves to draw heated air out of the area beneath the lamp and the platen.

Another technique for reducing platen overheating is found in U.S. Pat. No. 4,183,656. The heat buildup is moderated by controlling the travel distance of the scanning assembly coupled with periodic interruption in lamp operation. U.S. Pat. No. 4,684,237 discloses a CVT type of system where the illumination assembly, stationary during exposure, is alternately moved to new scan locations after each exposure, thus preventing heat buildup in any given incremental width area of the platen.

Other techniques require a heat-containing or reflecting component to be interposed between the lamp and the platen. Japanese publication 56—62269 (Kiyougora) discloses a transparent filter with a heat-reflecting layer interposed between the lamp and the platen. U.S. Pat. No. 3,936,672 referenced supra, also disclosed that the lamp, partially enclosed by reflector 5, further has a screen 6 which maybe glass or a red filter to reflect infrared rays and prevent them from striking the platen. U.S. Pat. No. 4,411,516 also discloses an embodiment, shown in FIG. 3, wherein a glass plate with an interference film applied to the plate ("hot mirror 28") transmits the visible light from the illumination lamp but reflects the heat rays.

Finally, U.S. Pat. No. 3,712,731 discloses still another method for preventing heat buildup at the platen by interposing a heat shield plate downstream from the illuminated zone.

Each of the foregoing solutions to the platen overheating problem have various drawbacks and disadvantages. Those designs requiring blower motors or specially constructed filters add an additional expense to the system design. Changing the scan distance or scan position requires additional complexities of system control.

The present invention is, therefore, directed to a simple, inexpensive solution to the platen overheating problem described above. It has been found that platen heat buildup can be reduced by enveloping the illumination lamp within a glass tube annulus open at both ends. The glass properties are designed to withstand the heat output generated by the particular illumination lamp used. In the embodiment disclosed, a halogen lamp is used with a PYREX TM tube. As the lamp assembly in one embodiment is moved along a document scan path, a portion of the heat generated by the lamp is entrapped between the lamp envelope and the annulus envelope, and passes out of both ends of the annulus into a vent area, along a convection path. Additional heat energy is absorbed by the glass tube and transferred by convection to the air surrounding the glass tube or conducted via heat conduction paths that can exist between the glass tube reflector and underlying scan carriage.

In further embodiments, the basic design is enhanced by creating a positive air flow by means of blowers and duct work. More particularly, the invention is directed towards a document scan/illumination system wherein a document on a document platen is incrementally illuminated by a scan assembly beneath said platen, said scan assembly adapted to reduce in heat buildup at the platen, and including, in combination, an elongated illumination lamp and a glass tube annulus open at both ends encompassing said lamp to create a partially confined interior space between said lamp and annulus. In a specific embodiment a scan carriage is adapted to carry said lamp and annulus beneath the platen in a document scanning mode of operation whereby heat generated by said lamp is at least partially contained within said interior space, and is transferred by convection through the open ends of the annulus. In addition, a portion of the heat generated by the lamp is absorbed by the glass tube and transferred by convection to the air surrounding the glass tube. Additional heat is also transferred via conduction paths that exist between the glass tube, reflector and scan carriage.

DESCRIPTION OF THE INVENTION

Figure 1:
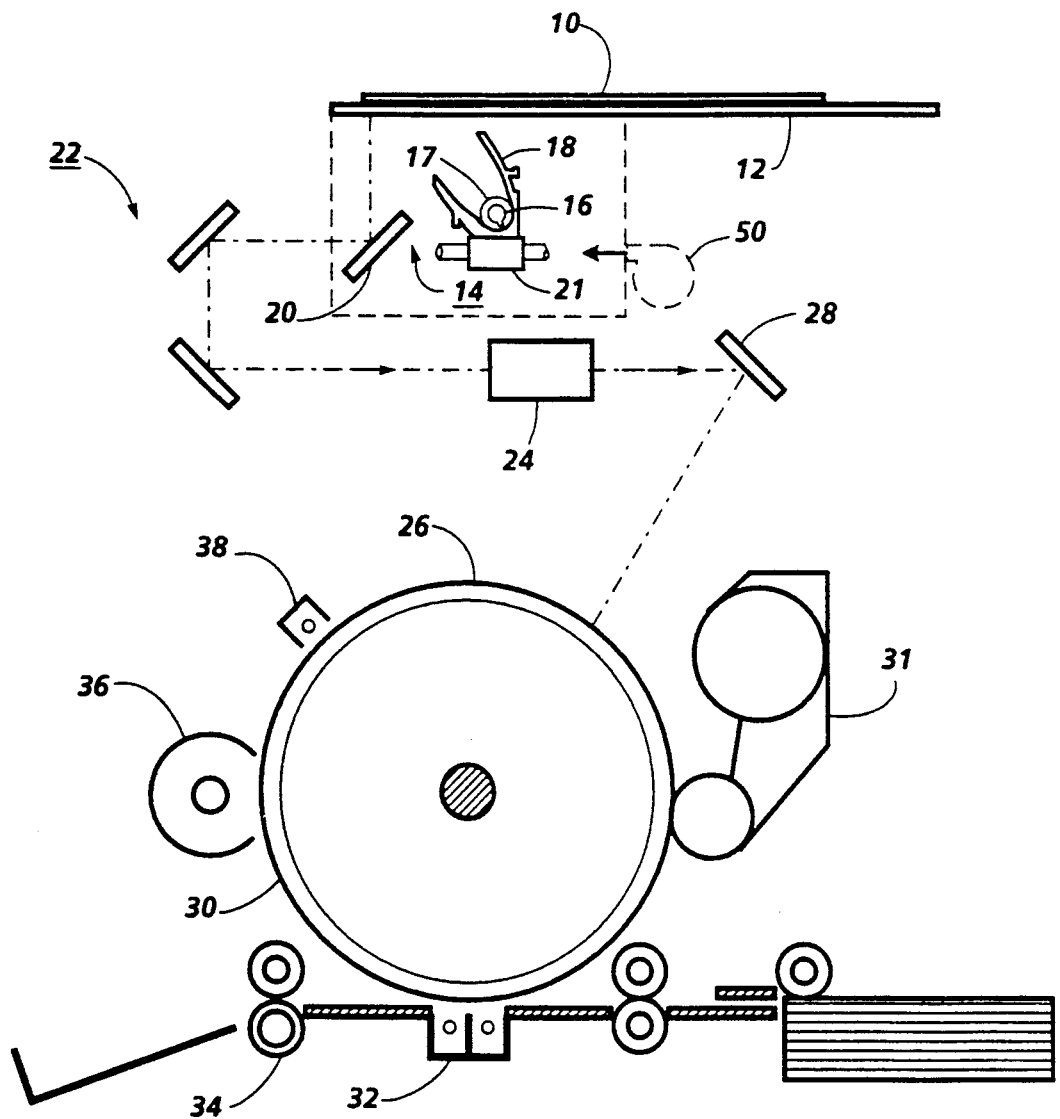
FIG. 1 is a side schematic view of a document imaging system incorporating the document illumination lamp assembly of the present invention.

Turning now to the figures, FIG. 1 is a side schematic view of a document imaging system incorporating a tungsten halogen lamp as the document illuminator. It is understood that other types of illumination lamps may be used consistent with the principles of the present invention. As shown, a document 10 to be copied is placed on the surface of a transparent platen 12. A scanning assembly 14 consists of a tungsten halogen lamp 16 located within a glass tube annulus 17, an associated reflector 18, and a scan mirror 20. Scanning assembly 14 is mounted for parallel movement along a scan path beneath and parallel to platen 12 on a scan carriage 21. Half-rate mirror assembly 22, adapted to travel on a ½ rate scan carriage (now shown) at ½ the rate of mirror 20, reflects line images of the document into projection lens 24. Lens 24 projects a flowing image of the document onto the surface of drum 26 via drum mirror 28. Arranged around the drum 26 are conventional xerographic processing stations: a developing station 31 for applying a toner of suitable plurality to the latent image formed on the drum surface; a transfer station 32 for transferring the developed image to an output sheet; fusing station 34 for fixing the transferred image to the copy sheet; a cleaning station 36 and a charging station 38 for applying a uniform charge to the drum surface.

In a document scanning mode, carriage 21 is driven on guide rails by conventional drive means, from left to right to incrementally scan document 10. The carriage drive system of U.S. Pat. No. 4,386,842 is suitable for this purpose and the contents of this patent are hereby incorporated by reference. At the end of scan, the carriage is returned to the start of scan position. During repeated scan operation, heat generated by the lamp, in the absence of any heat reduction mechanism, could result in an overheating condition at the platen which might result in an unsafe condition for an operator, or possibly subject the platen glass to stresses and fractures.

Figure 2:
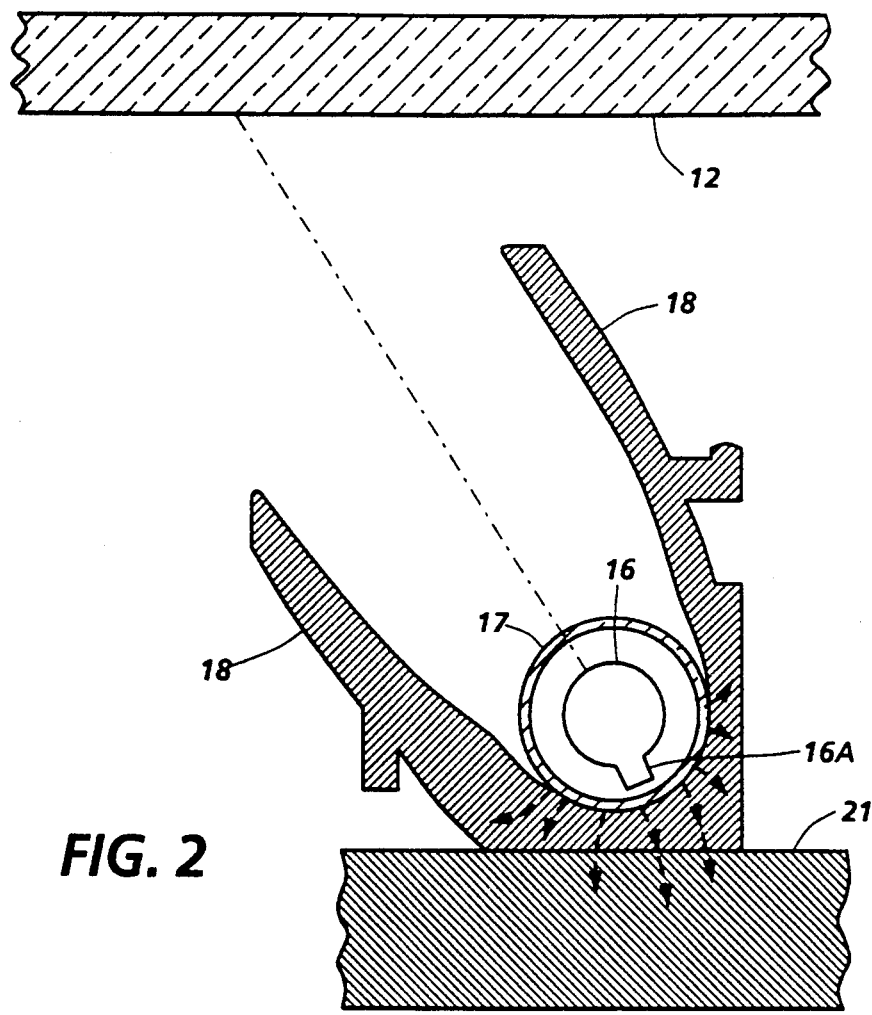
FIG. 2 is an enlarged side view of the lamp assembly of FIG. 1.
Figure 3:
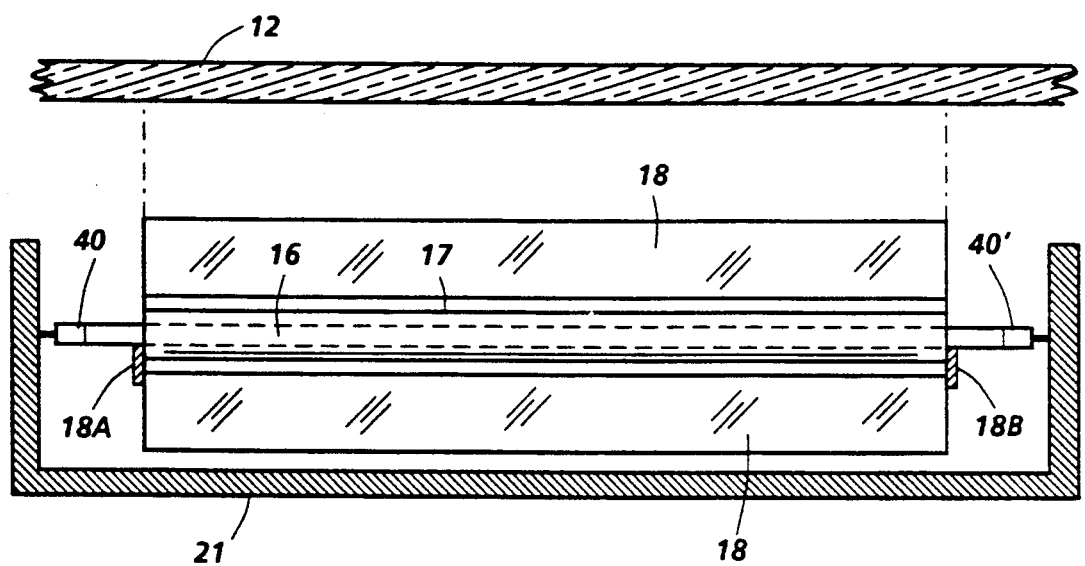
FIG. 3 is a front view of the lamp assembly shown in FIG. 2.

According to the principles of the present invention, enclosing lamp 16 within glass tube 17 reduces the heat buildup at the platen during the various modes of operation. Referring to FIGS. 2 and 3, scanning assembly 14 is shown, absent scan mirror 20, in an enlarged detailed end and front view, respectively. For this embodiment, lamp 16 is a segmented frosted halogen lamp with a normal operating temperature between 300–500° C. Lamp protrusion 16A, formed essentially along the lamp envelope midpoint, is the usual projection formed at the lamp sealing point. Protrusion 16A is preferably located so as to ensure proper eating of the annulus and to attain maximum surface area contact with reflector 18. The lamp is mounted by end caps 40, 40' to the frame of carriage 21. Glass tube 17, for this embodiment, is made of PYREX ™ and has an outside diameter small enough to fit properly inside reflector 18 and an inside diameter large enough to accommodate the insertion of the lamp 16. The glass tube is cradled within the curved portion of aluminum reflector 18. The diameter of glass tube 17 has approximately the same curvature as reflector base portion 18 to provide a snug seating for the lower half of glass tube 17. Glass tube 17 is restrained from horizontal motion within reflector base portion 18 by protrusions 18A, and 18B. It is noted, however, that both ends of glass tube 17 are open, the tab protrusions extending only slightly into the open ends.

In operation, and referring to FIGS. 1, 2, and 3, as a scan operation begins, lamp 16 is turned on and the intense light output generated by the lamp is directed by the curved sides of reflector 18 towards the platen 12 to form an incremental illumination strip along the platen width. Carriage 21 is moved in a left-to-right direction and light reflected from document 10 is reflected by mirror 20, mirror pair 22, and projected by lens 24 along the optical path to expose the photoreceptor 26 in an image-wise pattern representative of the document. As the scanning operation progresses, a portion of the heat generated by lamp 16 is contained by glass tube annulus 17; e.g. is entrapped between the lamp 16 envelope and the inner wall envelope of glass tube 17. Some of this heated air is transferred by convection out of the open ends of the glass tube annulus. Heat transfer is enhanced, according to a further aspect of the invention, by an additional factor resulting from the conduction of heat from the glass tube annulus envelope to the carriage 21 via reflector base portion 18. Thus, as best shown by the arrow sequence in FIG. 2, an additional heat transfer path is established along the length of the conductive reflector base portion 18, some of which flows into carriage 21 which acts as a heat sink. In addition, heat absorbed by the glass tube is transferred by convection to the air surrounding the glass tube. The heat transferred by convection to the air surrounding the carriage can be naturally vented to ambient. Various enhancements are possibly consistent with the principles of the present invention. Some systems, for example, may require an even further reduction of heat at the platen and the economics of a particular system may permit the addition of mechanisms and components to assist the convection transfer and venting of heat. As one example, a positive or a negative air pressure may be created by installing optic cooling fan 50 (shown in dotted form in FIG. 1) which will more readily vent the heated air escaping from the glass tube annulus 17, reflector 18, and carriage 21 into the ambient. It has been demonstrated using a configuration similar to one shown in FIG. 1, with fan 50 installed, that a significant reduction (5–12° C.) in platen temperature is achieved during operation with the glass tube 17 compared to operation without the glass tube 17. Other enhanced embodiments are shown in FIG. 4.

Figure 4:
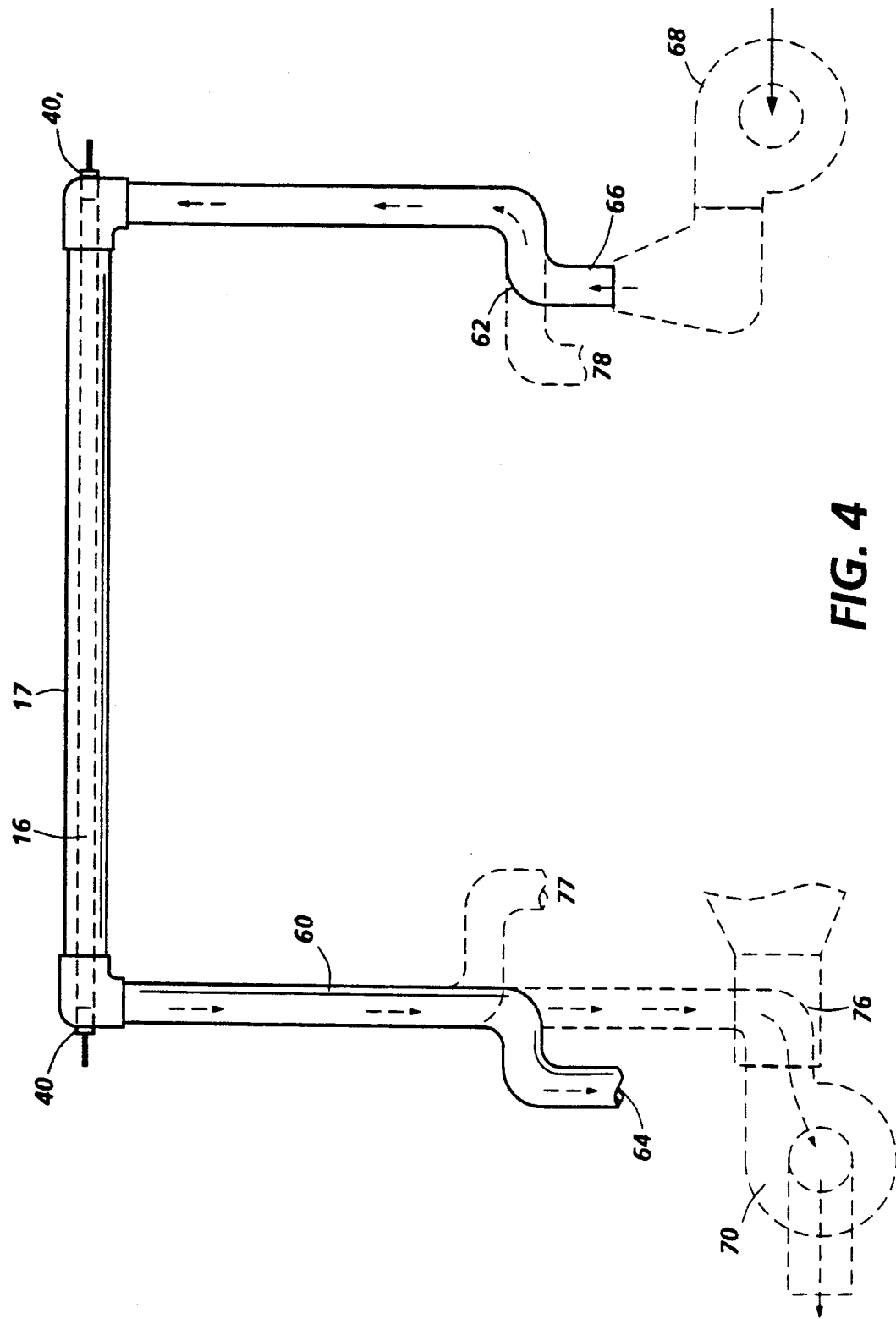
FIG. 4 is a modified version of the document illumination assembly shown in FIG. 3 incorporating mechanisms to establish positive or negative air flows.

FIG. 4 is simplified illustration of FIG. 3 which shows only lamp 16 and annulus 17, with additional components added thereto. A confined convection path is established by connecting a tubing or conduit system to both ends of the annulus. Tubing 60, 62 (flexible where required) is connected to the ends of the annulus 17 and sealed, with heat resistant sealant, around the end caps 20, 20' respectively. The ends are connected to the ambient by the outlet 64 and inlet 66 ports. Other options are to use outlet 77 and inlet 78 ports which would work in conjunction with the venting associated with an optic cooling fan 50 shown in FIG. 1. All ports may optionally incorporate air filters (not shown).

With this embodiment, a forced heated air flow can be created and controlled by the use of one or both of the blower fans 68 and 70 (blower 70 can be used with or without vacuum plenum 76). The air flow through the tubing is shown by dotted arrows. Depending on the configuration used, the heated air will be vented to ambient via outlet 64, outlet 77 working in conjunction with the venting associated with an optic cooling fan 50 shown in FIG. 1, or the discharge of blower 70 (with or without the incorporation of a vacuum plenum).

The required volumetric flow rate through the annulus, to attain desired or maximum cooling, is expected to be low. Therefore, a diaphragm type air pump may be considered for use instead of the blower fan 68 or other blower fans already existing in various machine configurations (i.e., optics cooling fans, fuser fans, vacuum transport systems for paper handling, etc...) can be tapped into and used in the same capacity as fans 68 and 70.

While the disclosed embodiments utilized a halogen lamp, other types of lamps such as fluorescent lamps, can also be utilized consistent with the principles of the present invention. The basic requirements for construction of the annulus is that it be transparent to the lamp radiation output (typically in the 4,000-7,000 angstrom range) and that it be able to accept a temperature gradient along its length consistent with the type of lamp in use, e.g. The annulus must be resistant to stress or softening associated with the operating temperature of the particular lamp.

In summary, the present invention, in its simplest form, and without positive or negative air flow mechanisms or the use of a specific filter, prevents a portion of the heat created during lamp operation from reaching the platen by trapping the heated air in the space between the annulus and the lamp and out of the open ends of the annulus along a convection path. A second mechanism for reducing the heat at the platen is found in the radiation transmissivity of the glass tube. A portion of the heat and light energy generated by the lamp is absorbed or reflected by the glass annulus and prevented from reaching the platen. A third mechanism of heat transfer by conduction is created when the annulus is mounted in a design which allows heat absorbed by the annulus to be conducted to a heat sink such as the scan carriage and reflector.

Other changes and modifications may be possible, consistent with the principles of the present invention and as embraced in the following claims. For example, while the invention is shown in the context of a fixed platen and moving scan/illumination optics, some degree of heat transfer is effected with the other type of scan modes referred to in the background section; e.g. a moving platen, fixed optics, or a CVT system. All such modifications and changes are intended to be encompassed within the following claims.

What is claimed is:

1. In a document scan/illumination system wherein a document on a document platen is incrementally illuminated by a scan assembly beneath said platen, said scan assembly adapted to reduce heat buildup at the platen and including, in combination an elongated illumination lamp, and
    a glass tube annulus open at both ends to create a partially confined interior space between said lamp and annulus.

2. The system of claim 1 further including a scan carriage adapted to carry said lamp and annulus beneath the platen in a document scanning mode of operation whereby a portion of the heat generated by said lamp is contained within said interior space and is transferred by convection through the open ends of the annulus and a portion of the heat absorbed by the glass is transferred by convection to the air surrounding the annulus.

3. The system of claim 2 further including a elongated conductive reflector having a curved base portion, said glass tube and said base portion having approximate complementary curvatures such that said annulus is seated within said semicircular base portion, said reflector further supported on said scan carriage whereby a portion of the heat absorbed by the glass tube annulus is transferred by conduction to the scan carriage and the reflector.

4. The system of claim 3 wherein said reflector includes a tab member which is in contact with the annulus ends and restrains horizontal movement of said annulus.

5. The system of claim 2 further including means for establishing a convection air path in a predetermined direction.

6. The system of claim 5 further including a conduit means connected to both ends of said glass tube annulus, and further including means at one end or both ends of said conduit means to establish a predetermined forced convection air flow.

* * * * *